United States Patent
Kawai et al.

(10) Patent No.: US 7,882,709 B2
(45) Date of Patent: Feb. 8, 2011

(54) GLASS SUBSTRATE FOR AN INFORMATION RECORDING MEDIUM, METHOD FOR MANUFACTURING A GLASS SUBSTRATE FOR AN INFORMATION RECORDING MEDIUM, AND AN INFORMATION RECORDING MEDIUM

(75) Inventors: Hideki Kawai, Kobe (JP); Kenichi Sasaki, Osaka (JP); Hiroaki Sawada, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/312,685

(22) PCT Filed: Nov. 5, 2007

(86) PCT No.: PCT/JP2007/071485

§ 371 (c)(1),
(2), (4) Date: May 21, 2009

(87) PCT Pub. No.: WO2008/062656

PCT Pub. Date: May 29, 2008

(65) Prior Publication Data

US 2009/0252993 A1    Oct. 8, 2009

(30) Foreign Application Priority Data

Nov. 22, 2006    (JP)    ............................ 2006-315393

(51) Int. Cl.
  G11B 5/73    (2006.01)
  C03C 15/00    (2006.01)
(52) U.S. Cl. ..................... 65/30.14; 65/400; 428/846.9; 428/848.8

(58) Field of Classification Search ................. 65/30.14, 65/400; 428/846.9, 848, 848.8, 66.6, 64.3, 428/64.2, 848.1; 438/3
See application file for complete search history.

(56) References Cited

U.S. PATENT DOCUMENTS 5,733,622 A    3/1998    Starcke et al.

(Continued)

FOREIGN PATENT DOCUMENTS

JP    08-180402    7/1996

(Continued)

OTHER PUBLICATIONS

Translation JP 08-180402 (date Jul. 1996).*

(Continued)

*Primary Examiner*—Kevin M. Bernatz
*Assistant Examiner*—Louis Falasco
(74) *Attorney, Agent, or Firm*—Brinks Hofer Gilson & Lione (57) ABSTRACT

Provided are a glass substrate for an information recording medium, which has both high strength and high flatness and can be manufactured at low cost, a method for manufacturing such glass substrate and an information recording medium using such glass substrate. The glass substrate for the information recording medium satisfies inequalities of $0.1 \leq (W1-W3)/W2 \leq 5$, where, W1 is an ion concentration at the center portion in the thickness direction of the glass substrate in a chemically reinforced region at the outer circumference end surface and the inner circumference end surface of the glass substrate and is the maximum value of $K^+$ ion concentration, W2 is a $Na^+$ ion concentration at a position where the $K^+$ ion concentration is maximum, and W3 is a $K^+$ ion concentration in a glass substrate region not chemically reinforced.

8 Claims, 4 Drawing Sheets

U.S. PATENT DOCUMENTS

| | | | |
|---|---|---|---|
| 2002/0061603 A1* | 5/2002 | Eto | 438/3 |
| 2003/0099804 A1* | 5/2003 | Endo | 428/64.3 |
| 2003/0164005 A1* | 9/2003 | Saito et al. | 65/30.14 |
| 2003/0170417 A1* | 9/2003 | Saito et al. | 428/66.6 |
| 2003/0232219 A1 | 12/2003 | Nishizawa | |
| 2005/0142321 A1* | 6/2005 | Miyahara et al. | 428/64.2 |

FOREIGN PATENT DOCUMENTS

| | | |
|---|---|---|
| JP | 09-027150 | 1/1997 |
| JP | 11-268932 | 10/1999 |
| JP | 2004-022031 | 1/2004 |
| JP | 2005-174500 | 6/2005 |
| WO | WO 2008/062656 A1 | 5/2008 |

OTHER PUBLICATIONS

Translation JP 11-268932 (date Oct. 1999).*
Translation JP 2005-174500 (date: Jun. 2005).*
International Search Report in International Application No. PCT/JP2007/071485, dated Jan. 29, 2008, 2 pages.

* cited by examiner

GLASS SUBSTRATE FOR AN INFORMATION RECORDING MEDIUM, METHOD FOR MANUFACTURING A GLASS SUBSTRATE FOR AN INFORMATION RECORDING MEDIUM, AND AN INFORMATION RECORDING MEDIUM

This application is a National Stage of International Application PCT/JP2007/071485 filed with Japanese Patent Office on Nov. 5, 2007.

FIELD OF THE INVENTION

The present invention relates to an information recording glass substrate used for an information recording medium with a recording layer utilizing properties of magnetism, light, and magneto optics, methods for manufacturing the image recording glass substrate, and the information recording medium.

BACKGROUND OF THE INVENTION

The magnetic disk is one of the typical information recording medium having a recording layer utilizing properties of magnetism, light, and magnetooptics. Aluminum substrates have been widely used as a magnetic disk substrate. However, in recent years, there has been an demand for reduction in the levitation height of a magnetic head for improvement in the recording density. To meet this demand, there has been an increasing percentage in the use of the glass substrate as a magnetic disk substrate, because the glass substrate can reduce the levitation height owing to a smoother surface and fewer surface defects than the aluminum substrate.

In the method for manufacturing the aforementioned glass substrate for an information recording medium such as a magnetic disk, it is a common practice to reinforce the glass substrate by providing chemical reinforcing treatment on the surface of the glass substrate for the purpose of enhancing crashworthiness and vibration resistance of a glass substrate to prevent the substrate from being damaged by impact or vibration. Chemical reinforcing treatment is normally performed by an ion exchange method where a glass substrate is dipped in a chemical reinforcing solution, and the $Na^+$ ion on the surface of the glass substrate is exchanged with the $K^+$ ion in a chemical reinforcing solution, whereby a compressive stress layer is formed on the surface of the glass substrate.

After chemical reinforcement, the chemically reinforced surface is usually subjected to a polishing process in order to remove erosion by the chemical reinforcing solution and fine scratches thereby ensuring the required smoothness. However, there is a problem that the glass substrate warps and the flatness of the substrate is degraded due to the imbalance between the stresses of the frond and back surfaces because a part of the compressive stress layer on the glass substrate is removed in the polishing process.

In order to prevent the degradation of the flatness, proposed is an information recording glass substrate where the reduction in the thickness of the glass substrate by polishing after the chemical reinforcement is controlled in the range of 0 μm or more without exceeding 0.4 μm on each side (Patent Document 1).

Patent Document 1: Japanese Unexamined Patent Application Publication No. H11-268932.

DISCLOSURE OF THE INVENTION

Problems to be Solved by the Invention

However, even if the reduction in the thickness of the glass substrate by polishing after chemical reinforcement is controlled in the range specified in Patent Document 1, a strict agreement between the amounts of reduction on the front surface and back surface of the glass substrate is required to prevent degradation of the flatness of the glass substrate. It takes much labor and time to satisfy this requirement, and thereby causing a higher cost.

In view of the above-described problems, it is an object of the present invention to provide glass substrates for information recording media, methods for manufacturing the glass substrate for the information recording medium, and information recording media using the glass substrate for the information recording medium, wherein the glass substrate is characterized by a high degree of strength and flatness, and is manufactured at reduced costs.

Means for Solving the Problems

To solve the aforementioned problems, the present invention is characterized as follows.

Item 1. A glass substrate for an information recording medium which is a disk shaped glass substrate having a center hole, contains at least $Na_2O$ as a composition thereof, and includes, on an outer circumferential end face and an inner circumferential end face, regions which are chemically reinforced with a chemically-reinforcing treatment liquid containing a $K^+$ ion, wherein the following relationship is satisfied:

$$0.1 \leq (W1 - W3)/W2 \leq 5$$

wherein:

W1 is a maximum value of a $K^+$ ion concentration at a central portion in a thickness direction of the glass substrate, in the chemically reinforced regions on the outer circumferential end face and the inner circumferential end face;

W2 is an $Na^+$ ion concentration at a position at which the $K^+$ ion concentration is the maximum value W1; and W3 is a $K^+$ ion concentration in a not chemically-reinforced region of the glass substrate.

Item 2. A glass substrate for an information recording medium which is-a disk shaped glass substrate having a center hole, contains at least $Na_2O$ as a composition thereof, and includes, on an outer circumferential end face and an inner circumferential end face, regions which are chemically reinforced with a chemically-reinforcing treatment liquid containing a $K^+$ ion, wherein the following relationship is satisfied:

$$1 \leq (W1 - W3)/W2 \leq 5$$

wherein:

W1 is a maximum value of a $K^+$ ion concentration at a central portion in a thickness direction of the glass substrate, in the chemically reinforced regions on the outer circumferential end face and the inner circumferential end face;

W2 is an $Na^+$ ion concentration at a position at which the $K^+$ ion concentration is the maximum value W1; and W3 is a $K^+$ ion concentration in a not chemically-reinforced region of the glass substrate.

Item 3. The glass substrate for an information recording medium of Item 1 or 2, wherein the position at which the $K^+$ ion concentration is the maximum is located inside away from the outer circumferential end face and the inner circumferential end face.

Item 4. The glass substrate for an information recording medium of any one of Items 1 through 3, the glass substrate includes $Li_2O$ in addition to $Na_2O$ as a component thereof.

Item 5. A method for manufacturing a glass substrate for an information recording medium, including the step of chemically reinforcing, with a chemical reinforcement processing solution containing a $K^+$ ion, a glass substrate which is a disk-shaped glass substrate, has a center hole, and contains at least $Na_2O$ as a composition thereof, wherein the step of chemically reinforcing is a step for chemically reinforcing the glass substrate, wherein the following relationship is satisfied:

$$0.1 \leq (W1-W3)/W2 \leq 5$$

wherein:

W1 is a maximum value of a $K^+$ ion concentration at a central portion in a thickness direction of the glass substrate, in chemically reinforced regions on an outer circumferential end face and an inner circumferential end face;

W2 is an $Na^+$ ion concentration at a position at which the $K^+$ ion concentration is the maximum value W1; and W3 is a $K^+$ ion concentration in a not chemically-reinforced region of the glass substrate.

Item 6. A method for manufacturing a glass substrate for an information recording medium, including the step of chemically reinforcing, with a chemical reinforcement processing solution containing a $K^+$ ion, a glass substrate which is a disk-shaped glass substrate, has a center hole, and contains at least $Na_2O$ as a composition thereof, wherein the step of chemically reinforcing is a step for chemically reinforcing the glass substrate, wherein the following relationship is satisfied:

$$1 \leq (W1-W3)/W2 \leq 5$$

wherein:

W1 is a maximum value of a $K^+$ ion concentration at a central portion in a thickness direction of the glass substrate, in chemically reinforced regions on an outer circumferential end face and an inner circumferential end face;

W2 is an $Na^+$ ion concentration at a position at which the $K^+$ ion concentration is the maximum value W1; and W3 is a $K^+$ ion concentration in a not chemically-reinforced region of the glass substrate.

Item 7. The method for manufacturing a glass substrate for an information recording medium of Item 5 or 6, wherein the position at which the $K^+$ ion concentration is at the maximum is located inside away from the outer circumferential end face and the inner circumferential end face.

Item 8. An information recording medium, comprising:

at least a recording layer provided on a glass substrate for an information recording medium of any one of Items 1 through 4.

Item 9. The information recording medium of Item 8, wherein the recording layer is a magnetic layer.

Effects of the Invention

According to the present invention, the stresses balance between the outer and inner circumferential end faces of a glass substrate is obtained by ensuring that the $K^+$ ion concentration and $Na^+$ ion concentration in the chemically reinforced regions on the outer and inner circumferential end faces of a glass substrate is kept within a predetermined range. Thus, this invention provides glass substrates for information recording media, methods for manufacturing the glass substrate for information recording media, and an information recording medium using the glass substrate for information recording media, wherein the glass substrate is characterized by a high degree of strength and flatness, and is manufactured at reduced costs.

LEGEND 10, 10a, 10b Glass substrates
11, 11a, 11b Front surfaces
12, 12a, 12b Back surfaces
13. Center hole
14. Outer circumferential end face
15. Inner circumferential end face
16, 17 Chamfered portion
18. Chemically reinforced region
19. Not chemically-reinforced region

BEST MODE FOR CARRYING OUT THE PRESENT INVENTION

The following describes the details of the embodiments of the present invention with reference to the drawings.

(Glass Substrate for an Information Recording Medium)

Figure 3A:
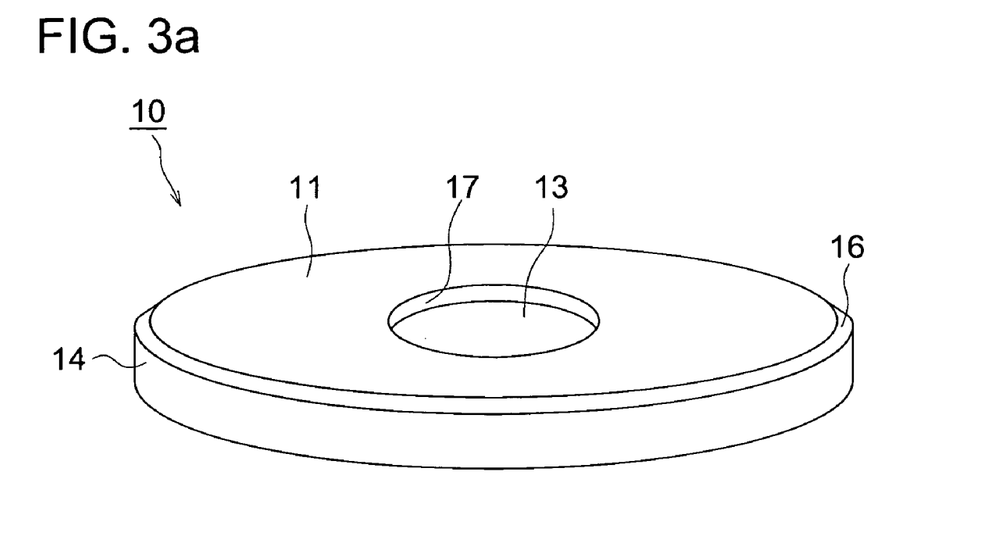
FIGS. 3a and 3b are diagrams showing an example of the glass substrate for an information recording medium of the present invention.
Figure 3B:
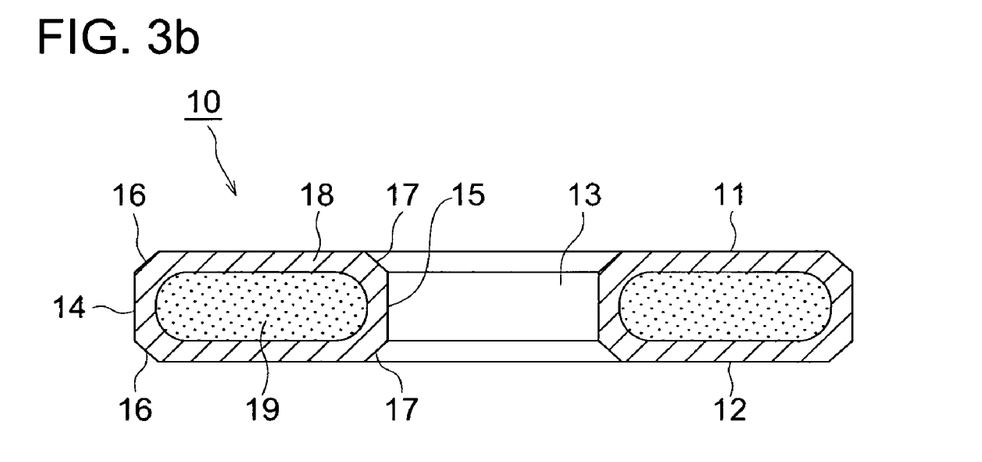

FIGS. 3a and 3b are diagrams showing an example of the glass substrate for an information recording medium of the present invention. FIG. 3a is a perspective view, and FIG. 3b is a cross sectional view. A glass substrate 10 is a disk-shaped glass substrate having a center hole 13, and has a front surface 11 and a back surface 12 where a recording layer is formed. An outer circumferential end face 14 and inner circumferential end face 15 are provided with chamfered portions 16 and 17, respectively.

The glass substrate 10 contains a chemically reinforced region 18 and a not chemically-reinforced region 19. The chemically reinforced region 18 is the region where at least part of the $Na^+$ ions as a component of the glass substrate are replaced with $K^+$ ions having a greater radius than an $Na^+$ ion by dipping the glass substrate into a heated chemical reinforcing solution. In the chemically reinforced region 18, there is generated a compressive stress due to the distortion resulting from the difference in ion radius, whereby the glass substrate is reinforced.

Figure 4A:
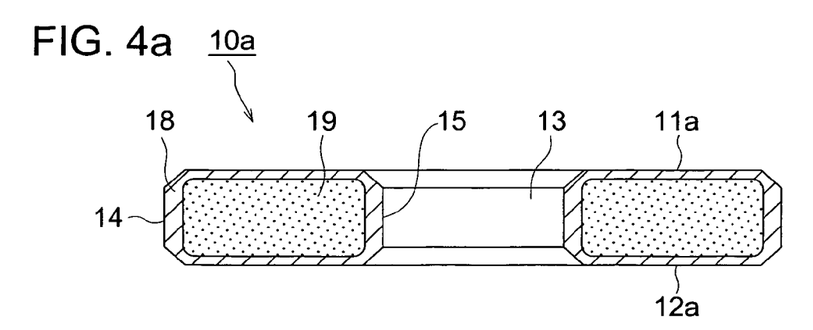
FIGS. 4a and 4b are diagrams showing another example of the glass substrate for an information recording medium of the present invention.
Figure 4B:
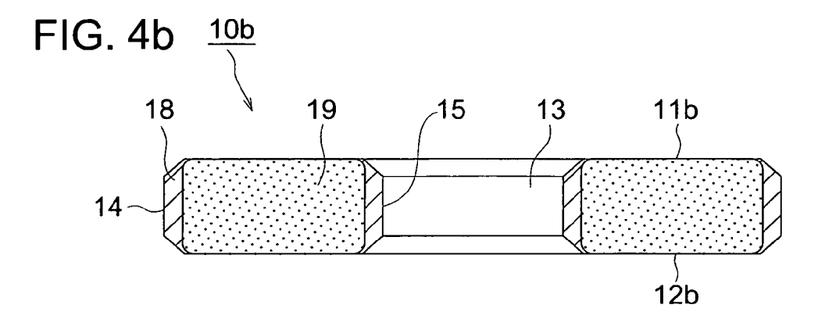

FIGS. 4a and 4b are diagrams showing another example of the glass substrate for an information recording medium of the present invention. FIG. 4a is a cross sectional view showing the glass substrate 10a when the amount of polishing subsequent to chemical reinforcement is further increased. FIG. 4b is a cross sectional view showing the glass substrate 10b when the amount of polishing subsequent to chemical reinforcement is still further increased. In the glass substrate 10a of FIG. 4a, as a result of polishing the front surface 11a and the back surface 12a, the thickness of the chemically reinforced region remaining on the front surface 11a and the back surface 12a is smaller than the thickness of the chemically reinforced region remaining on the outer circumferential end face 14 and the inner circumferential end face 15. Further, in the glass substrate 10b of FIG. 4b, the polished amount of the front surface 11b and the back surface 12b is still greater. Thus, on the front surface 11b and the back surface 12b, the not chemically-reinforced region 19 is directly exposed, and the chemically reinforced region 18 is found only on the outer circumferential end face 14 and the inner circumferential end face 15.

As described above, in the glass substrate for an information recording medium of the present invention, there is no particular restriction to whether or not there remains a chemically reinforced region on the front surface and back surface, or to the depth of the chemically reinforced region. It is only required that chemically reinforced regions should be present at least on the outer circumferential end face and the inner circumferential end face.

In the chemically reinforced region, the $Na^+$ ions as a component of the glass substrate are replaced with $K^+$ ions. Not only that, but $Li^+$ ions can be replaced with the $Na^+$ ions or $K^+$ ions if the $Li^+$ ions are included as a component of the glass substrate.

There is no particular restriction to the material of the glass substrate as long as it is glass including at least $Na_2O$ as a component and permits ion exchange when the glass is dipped into the chemical reinforcing solution including $K^+$ ions. The materials that can be used are exemplified by soda lime glass mostly composed of $SiO_2$, $Na_2O$, and $CaO$, aluminosilicate glass mostly composed of $SiO_2$, $Al_2O_3$, $R_2O$ (R=K, Na, and Li), borosilicate glass, $Li_2O$—$SiO_2$ based glass, $Li_2O$—$Al_2O_3$—$SiO_2$ based glass, and $R'O$—$Al_2O_3$—$SiO_2$ based glass (R'=Mg, Ca, Sr, and Ba). Of these materials, aluminosilicate glass and borosilicate glass are preferably used because they are characterized by excellent resistance to impact and vibration. Further, the glass including $Li_2O$ in addition to $Na_2O$ is preferably used from the viewpoint of ensuring effective ion exchange during chemically reinforcing treatment.

There is no particular restriction to the size of the glass substrate. It is possible to use various sizes of glass substrates having outer diameters of 2.5, 1.8, 1, and 0.8 inches, for example. Further, there is no particular restriction to the thickness of the glass. The glass substrates having various thicknesses—e.g., 2, 1, and 0.63 mm—can be utilized.

The present inventors have made concentrated study efforts to solve the aforementioned problem that the flatness of the chemically reinforced glass substrates is degraded, and have found out that the flatness of the glass substrate heavily depends on the stress on the outer circumferential end face and the inner circumferential end face of the glass substrate. The inventors' continued study efforts have succeeded in finding out that the flatness of the glass substrate can be prevented from being degraded by ensuring that the $K^+$ ion concentration and the $Na^+$ ion concentration in the reinforced regions of the outer circumferential end face and the inner circumferential end face of the glass substrate are kept within a predetermined range. To put it more specifically, assume that the maximum value of the $K^+$ ion concentration is W1, the maximum value of the $Na^+$ ion concentration is W2 at the position wherein the $K^+$ ion concentration is at a maximum, and the $K^+$ ion concentration in the not chemically-reinforced region is W3, wherein these concentrations refer to the ion concentrations at the center in the thickness direction of the glass substrate in the chemically reinforced regions on the outer circumferential end face and the inner circumferential end face. Under this assumption, if $0.1 \leq (W1-W3)/W2 \leq 5$, more preferably $1 \leq (W1-W3)/W2 \leq 5$ is satisfied, the balance between the respective stresses on the outer circumferential end face and the inner circumferential end face of the glass substrate is obtained, and the flatness of the glass substrate is prevented from being degraded.

Figure 1:
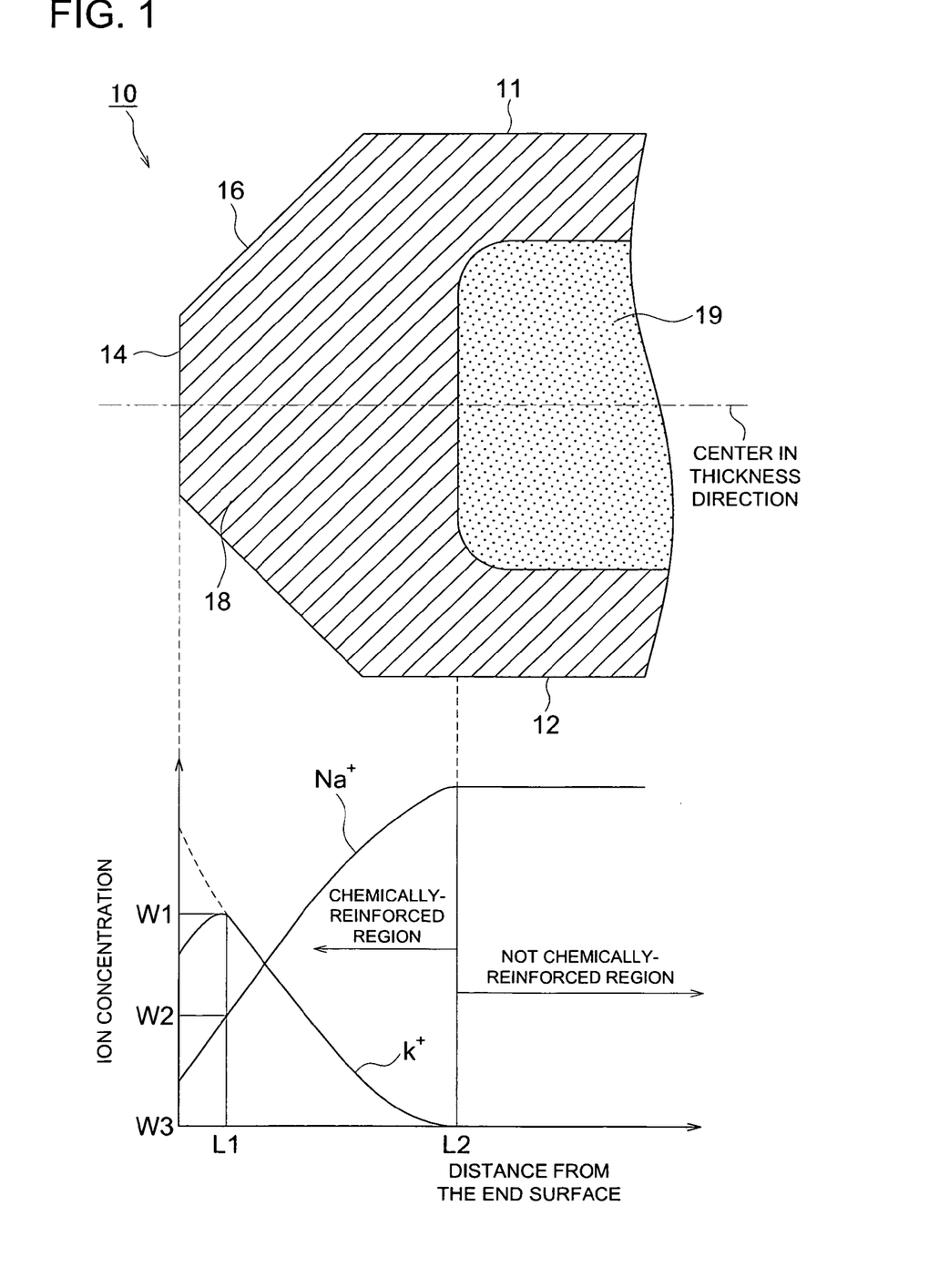
FIG. 1 is a chart showing an enlarged view of the vicinity of the outer circumference of the glass substrate 10 of an embodiment of the present invention, and the relationship, at the position corresponding to that, between the distance from the outer circumferential end face of the glass substrate and the ion concentration.

FIG. 1 is a chart showing an enlarged view of the vicinity of the outer circumference of the glass substrate 10 of an embodiment of the present invention, and the relationship between the distance from the outer circumferential end face of the illustrated portion of the glass substrate and ion concentration. This chart shows the $K^+$ ion concentration and the $Na^+$ ion concentration at the center in the thickness direction of the glass substrate. In the chart of FIG. 1, the not chemically-reinforced region 19 is located on the right side (center side of the glass substrate) of the point a distance L2 away from the end face, and the chemically reinforced region 18 is located on the left side (end face side of the glass substrate) of the point a distance L2 away from the end face.

The glass substrate 10 is made of the glass that does not contain $K_2O$, and therefore, the $K^+$ ion concentration (W3) in the not chemically-reinforced region 19 is 0. In the chemically reinforced region 18, the $K^+$ ion concentration is slightly higher at the position closer to the end face of the glass substrate. As shown by the dashed line of the chart, the $K^+$ ion concentration shows the maximum level at the end face, immediately after chemical reinforcement processing. Through the cleaning process succeeding the chemically reinforcing treatment, the $K^+$ ions in the vicinity of the end face leach out and are reduced in amount. As shown by the solid line of the chart, the maximum value (W1) of the $K^+$ ion concentration is found at the inside position a distance L1 away from the end face. The $K^+$ ion concentration can be at its maximum level at the end face, but the maximum level (W1) is preferably found at the inside position away from the end face. When the maximum level (W1) is found at the inside position away from the end face, excessive ion diffusion is suppressed and the $K^+$ ion distribution in the vicinity of the front surface is stabilized. Further, this distribution is also favorable because a possible chronological change and thermal change are minimized and a stable stress distribution is maintained. The examples of the cleaning solution that can be used include conventionally known cleaning water such as pure water, ion-exchange water, ion water, ozone water, ultra-pure water, distilled water, and hydrogen peroxide water; and conventionally known glass substrate cleaning solutions using acids such as hydrochloric acid, sulfuric acid, nitric acid, oxalic acid, acetic acid, citric acid, and hydrofluoric acid, or alkali components such as NaOH and KOH.

The $Na^+$ ion concentration is even across the not chemically-reinforced region 19. However, in the chemically reinforced region 18, the $Na^+$ ion concentration is slightly lower at the position closer to the end face of the glass substrate. The value is at its minimum at the end face. W2 denotes the $Na^+$ ion concentration at the position (L1) where the $K^+$ ion concentration is at its maximum.

When the $K^+$ ion concentration is at its maximum at the end face, W1 denotes the $K^+$ ion concentration at the end face, and W2 denotes the $Na^+$ ion concentration at the end face. FIG. 1 is an enlarged view showing only the portion close to the outer circumferential end face 14 of the glass substrate 10. However, the ion concentration distribution at the position close to the inner circumferential end face 15 of the glass substrate 10 is similar to that at the portion close to the outer circumferential end face 14.

If (W1−W3)/W2 is less than 0.1, there has been insufficient ion exchange between the $Na^+$ ions contained in the glass substrate and the $K^+$ ions contained in the chemical reinforcing solution. This situation cannot provide the strength required for the glass substrate for an information recording medium. Further, if (W1−W3)/W2 is in the range of 0.1 or more through 1, the compressive stress caused at the end face may be insufficient and the required strength may not be obtained. In the meantime, if (W1−W3)/W2 is greater than 5, there has been excessive ion exchange, and excessive stress is applied to the outer circumferential end face and the inner circumferential end face, whereby the flatness of the glass substrate tends to deteriorate.

Figure 2:
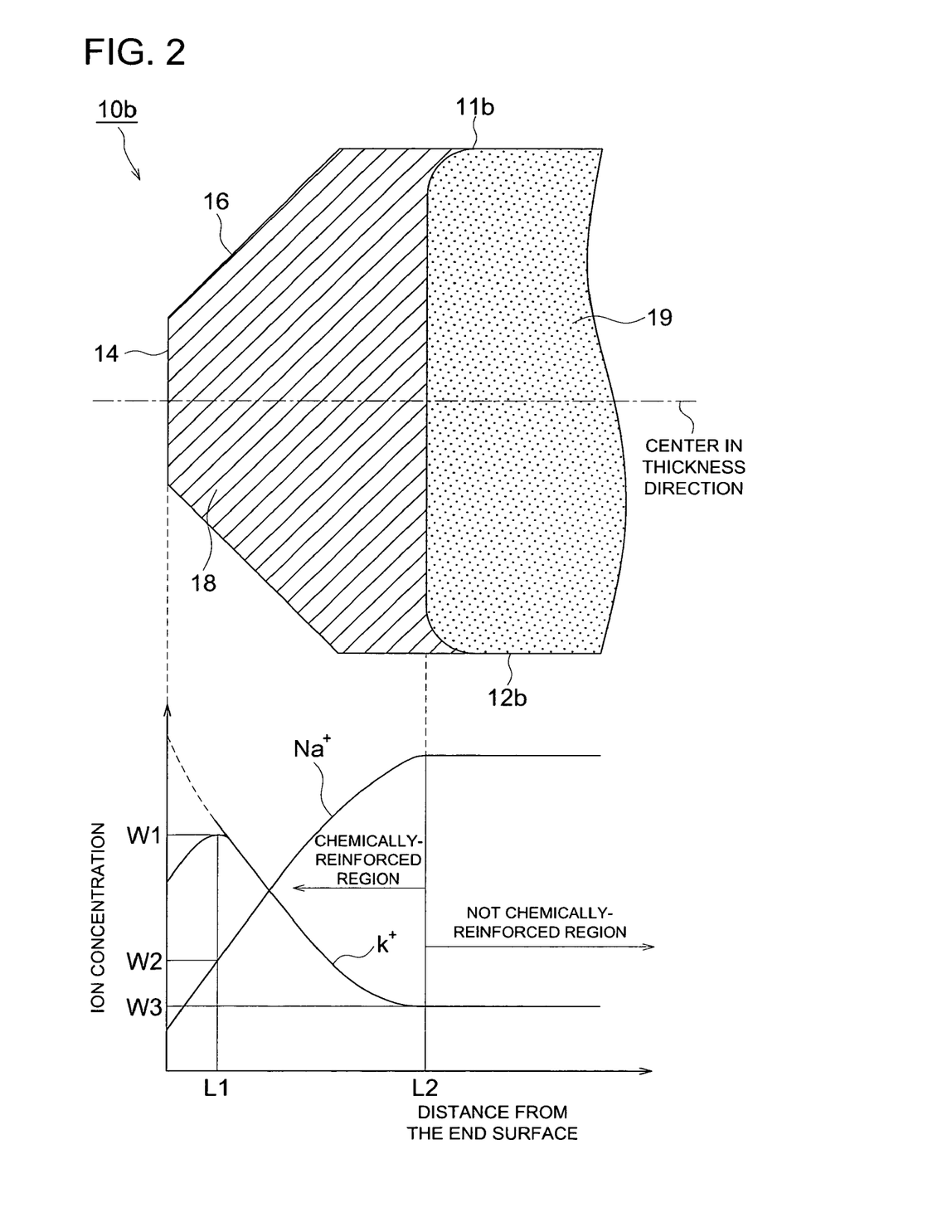
FIG. 2 is an enlarged view illustrating the vicinity of the outer circumference of the glass substrate 10b of another embodiment of the present invention, and a chart representing the relationship, at the position corresponding thereto, between the distance from the outer circumferential end face of the glass substrate and the ion concentration.

FIG. 2 is an enlarged view illustrating the vicinity of the outer circumference of the glass substrate 10b of another embodiment of the present invention, and a chart representing the relationship between the distance from the outer circumferential end face of the glass substrate and ion concentration. In the glass substrate 10b, the not chemically-reinforced region 19 is directly exposed as a front surface 11b and a back surface 12b. The chemically reinforced region 18 is found only at an outer circumferential end face 14 and an inner circumferential end face 15. The chart of FIG. 2 shows the $K^+$ ion concentration and $Na^+$ ion concentration at the center in the width direction of the glass substrate. Further, in the chart of FIG. 2, the not chemically-reinforced region 19 is located on the right of a distance L2 from the end face (center side of the glass substrate), and the chemically reinforced region 18 is located on the left of the position a distance L2 away from the end face (end face side of the glass substrate).

Unlike the case of FIG. 1, the glass substrate 10b is made of a glass containing $K_2O$ as a component, the $K^+$ ion concentration (W3) in the not chemically-reinforced region 19 of the glass substrate 10b indicates a certain value instead of 0 (zero). In the chemically reinforced region 18, the $K^+$ ion concentration is slightly higher at the position closer to the end face of the glass substrate. The maximum value of the $K^+$ ion concentration (W1) is found at the inside position a distance L1 away from the end face.

The $Na^+$ ion concentration is constant in the not chemically-reinforced region 19. However, in the chemically reinforced region 18, the $Na^+$ ion concentration is slightly lower at the position closer to the end face of the glass substrate. The value is at its minimum at the end face. W2 denotes the $Na^+$ ion concentration at the position (L1) where the $K^+$ ion concentration is at its maximum.

In the case of such a glass substrate 10b, similarly to the case of the glass substrate 10 of FIG. 1, if 0.1≦(W1−W3)/W2≦5 is satisfied and more preferably 1≦(W1−W3)/W2≦5 is satisfied, the balance between the stresses on the outer circumferential end face and the inner circumferential end face of the glass substrate is obtained, and the flatness of the glass substrate is secured without deterioration.

(Method for Manufacturing a Glass Substrate for an Information Recording Medium)

A glass substrate for an information recording medium is generally produced through those processes: a blank material production process, an inner/outer circumference working process, a grinding/polishing process, a chemical reinforcement process, and a cleaning process. The blank material production process is a process of producing a blank material to be a basic material for a glass substrate for an information recording medium. As examples of this process, a method for producing the blank material by press-molding the molten glass and a method for producing by cutting sheet-like glass are known. The inner/outer circumference working process includes processes of punching the center hole, grinding to obtain the intended shape and dimensional accuracy of the outer and inner end faces, and polishing the inner and outer circumferential end faces. The grinding/polishing process includes a grinding and polishing operation for the purpose of obtaining a required flatness and surface smoothness of the surface where a recording layer is formed. Generally, this process is carried out in several steps such as rough grinding, fine grinding, primary polishing, and secondary polishing steps. The chemical reinforcement process is a process of dipping a glass substrate in a chemical reinforcing solution, whereby the glass substrate is reinforced. The cleaning process removes the foreign substances remaining on the surface of the glass substrate such as abrasive powder and chemical reinforcing solution.

Of these processes, the chemical reinforcement process characterizes the method for manufacturing a glass substrate for an information recording medium of the present invention. In the present invention, the chemical reinforcement process can be performed before or after the grinding/polishing process. Alternatively, the chemical reinforcement process can be inserted at the time the grinding/polishing process has been performed to a certain extent, and after completion of the chemical reinforcement process, the remaining part of the grinding/polishing process can be resumed.

Various forms of processes other than the aforementioned ones can be included in the method for manufacturing a glass substrate for an information recording medium. Their examples include an annealing process of reducing the internal stress of the glass substrate, heat shock process for verifying the reliability of the strength of the glass substrate, and various inspection and evaluation processes.

(Chemical Reinforcement Process)

The chemical reinforcement process is carried out according to the ion exchange method where a glass substrate is dipped in a heated chemical reinforcing solution so that the $Na^+$ ions contained in the glass substrate are replaced by the $K^+$ ions contained in the chemical reinforcing solution. Compressive stress is produced in the ion-exchange region by the distortion caused by the difference in ion radius, whereby the surface of the glass substrate is reinforced. In this case, ion exchange is not restricted to the exchange between the $Na^+$ ions and the $K^+$ ions. It is also possible to simultaneously perform ion exchange between the $Li^+$ ions contained in the glass substrate, and the $Na^+$ ions and the $K^+$ ions contained in the chemical reinforcing solution.

The molten salt containing the $K^+$ ions or molten salt containing the $Na^+$ ions and the $K^+$ ions is commonly used as a chemical reinforcing solution. The molten salt containing the $Na^+$ ions and the $K^+$ ions is exemplified by a nitrate, carbonate, and sulfate of Na and K or a molten salt of a mixture thereof. Of these compounds, the nitrate is preferably used because it has a low melting point and helps to minimize deformation of the glass substrate.

It is preferred to use the molten salt obtained by mixing potassium nitrate and sodium nitrate at a mass ratio of 1 to 3 through 50 to 1. In this case, it is more preferred that the mass ratio should be 1 to 1 through 30 to 1. It is still more preferred to use the molten salt obtained by mixing potassium nitrate and sodium nitrate at a mass ratio of 2 to 1 through 15 to 1. If the ratio of mixing the potassium nitrate and sodium nitrate is smaller than the lower limit of 50 to 1, the ion exchange speed is extremely reduced and a sufficiently reinforced layer (where there is a change in ion concentration) cannot be easily gained. Further, if the ratio of mixing the potassium nitrate and sodium nitrate is greater than the upper limit of 1 to 3, the $Na^+$ ion exchange speed will be excessive and the desired distribution of ion concentration cannot be obtained. As a result excessive stress will occur and cause instability and deterioration of flatness.

The chemical reinforcing solution is heated a higher temperature than the melting point of the aforementioned components. However, if the chemical reinforcing solution is heated too much, the glass substrate temperature will be too high. This may cause deformation of the glass substrate. To avoid this deformation, the temperature of heating the chemical reinforcing solution is preferably lower than the glass transition temperature (Tg) of the glass substrate, more preferably lower than the glass transition temperature (Tg)-50° C.

The $K^+$ ion concentration and $Na^+$ ion concentration in the outer and inner circumferential end faces depends on the type of the glass substrate, chemical reinforcing solution, and dipping time. Accordingly, the temperature and dipping time of the chemical reinforcing solution are appropriately set based on the type of the glass substrate and chemical reinforcing solution to be used, whereby the $K^+$ ion concentration and $Na^+$ ion concentration in the outer and inner circumferential end faces can be made to satisfy the relationship $0.1 \leq (W1-W3)/W2 \leq 5$, more preferably $1 \leq (W1-W3)/W2 \leq 5$. Normally, as the temperature of the chemical reinforcing solution is higher and the dipping time is longer, the value of $(W1-W3)/W2$ is greater. Further, the temperature of the chemical reinforcing solution is lower and the dipping time is shorter, the value of $(W1-W3)/W2$ is smaller.

To protect the glass substrate against cracks caused by the thermal impact when the glass substrate is dipped into the heated chemical reinforcing solution, it is good practice to provide a preheating process where the glass substrate is heated to a predetermined level in a preliminary container, prior to dipping the glass substrate into the chemical reinforcement solution.

(Information Recording Medium)

An information recording medium can be obtained by forming at least a recording layer on the glass substrate for an information recording medium of the present invention.

There is no particular restriction to the type of the recording layer. It is possible to use various forms of recording layers that use the properties of magnetism, light, and magnetooptics. Especially, a magnetic layer is most preferably used as a recording layer to manufacture an information recording medium (magnetic disk).

There is no particular restriction to the type of the magnetic material used for the magnetic layer. Any one of the known materials can be used as appropriate. Examples containing Co as a major component include CoPt, CoCr, CoNi, CoNiCr, CoCrTa, CoPtCr, CoNiPt, CoNiCrPt, CoNiCrTa, CoCrPtTa, and CoCrPtSiO. It is also possible to use a multi-layer structure where the magnetic layer is separated by a non-magnetic film (Cr, CrMo, CrV, and others) to reduce noise.

In addition to the aforementioned Co-based materials, ferrite-based material and iron-rare earth materials can be used as the magnetic layer. Further, a granular structure can also be used where magnetic particles of Fe, Co, CoFe, and CoNiPt are dispersed in the non-magnetic film made of $SiO_2$ and BN.

A known method can be used to form the aforementioned magnetic film. For example, the sputtering method, electroless plating method, or spin coating method can be used.

The magnetic disk can be provided with an underlying layer, protective layer, and lubricating layer, as required. These layers can be formed by selecting the known materials as required. The materials of the underlying layer are exemplified by Cr, Mo, Ta, Ti, W, V, B, Al, and Ni. The materials of the protective layer are exemplified by Cr, Cr alloy, C, $ZrO_2$ and $SiO_2$. The lubricating layer can be coated with a liquid lubricating agent made of perfluoropolyether (PFPE) and others, and can be subjected to heat treatment.

EXAMPLE (Manufacturing the Glass Substrate)

Aluminosilicate glass was used as a glass material, and the molten glass was press-molded, whereby a blank material was produced. Then a glass substrate having an outer diameter of 65 mm, an inner diameter of 20 mm and a thickness of 0.635 mm was produced through the inner/outer circumference machining process and grinding/polishing process. The surfaces were finished with their roughness having an arithmetic mean height Ra (JIS B0601: 2001) of 0.4 through 0.5 nm. The flatness (PV value) was less than 1 μm both on the front surface and back surface. The flatness was measured the interference fringe method using a flatness primary standard finished to a level of 0.1 μm or less.

Molten mixture salt of potassium nitrate ($KNO_3$) and sodium nitrate ($NaNO_3$) was prepared as a chemical reinforcing solution. The mixture ratio was 1 to 1 in terms of mass ratio. The temperature of the chemical reinforcing solution was set at 400° C.

Twenty glass substrates were mounted on a conveyance jig and were dipped in the chemical reinforcing solution together with the conveyance jig. As shown in Table 1, chemical reinforcement processing was conducted with various dipping time from 5 to 1,200 minutes. After having been dipped for a predetermined period of time, the glass substrate together with the conveyance jig was taken out. The remaining chemical reinforcing solution was removed by an ultrasonic cleaner, and the glass substrate was cleaned with pure water. The glass substrate was then removed from the conveyance jig.

(Measuring the Ion Concentration)

Two glass substrates for each condition were sampled, and W1, W2, and W3 were obtained by measuring the distribution of the $K^+$ ion concentration and $Na^+$ ion concentration in the inner and outer circumferential end faces of the glass substrate, whereby the value of $(W1-W3)/W2$ was calculated. The $K^+$ ion concentration and $Na^+$ ion concentration were measured using a time-of-flight secondary ion mass spectrometer (Time of Flight (TOF)-SIMS).

(Measuring the Flatness)

Five glass substrates for each condition were sampled, and flatness (PV value) was measured. To measure the flatness, the interference fringe was measured, similarly to the case of measuring the substrate prior to chemical reinforcement. A smaller flatness was more preferred. If the flatness exceeds 5 μm, a problem will occur with the performance of the magnetic disk. If the average value of the flatness of five glass substrates does not exceed 5 μm, the measurement results are evaluated as Good (marked by B). If the average value exceeds 5 μm, the measurement results are evaluated as Poor (marked by C).

(Measuring the Strength in an Annular Bending Test)

Further, ten glass substrates for each condition were sampled, and the flatness of the glass substrates was measured by an annular bending test.

Figure 5:
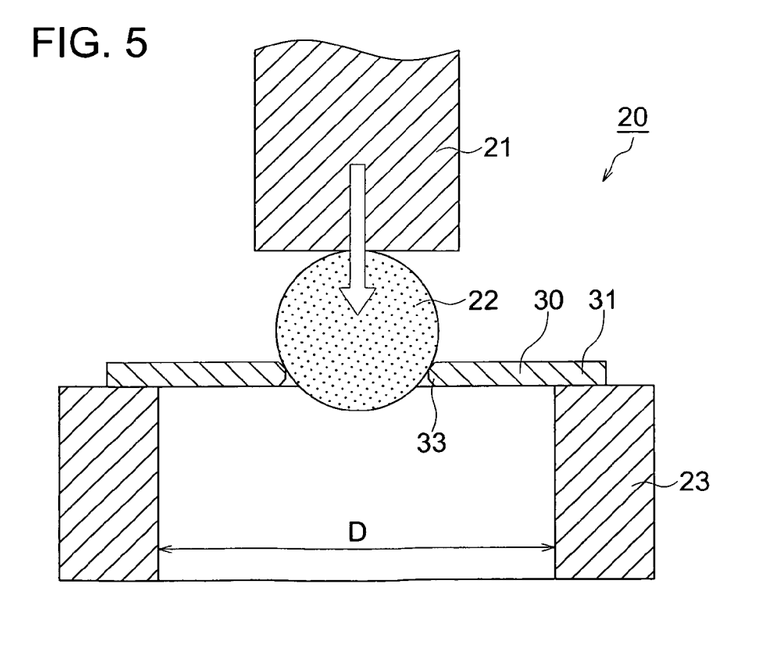
FIG. 5 is a schematic diagram representing an annular bending tester used in the example.

FIG. 5 is a schematic diagram representing an annular bending tester 20 used in this example. In the annular bending tester 20, a glass substrate 30 is put on a support base 23 with the outer circumference 31 supported in an annular form. A breakdown test was conducted where a steel ball 22 is mounted on the inner circumference 33 of the glass substrate 30, and a load 21 is applied to the inner circumference 33 of the glass substrate 30 through the steel ball 22. This is the test method commonly used in related industries as a strength test of an information recording medium for hard disks.

The support base 23 has a cylindrical shape having an inner diameter D of 63 mm. The steel ball 22 has a diameter of 28.57 mm and a mass of about 100 grams. This mass is negligible compared with the applied load 21. In contact with the inner circumference 33 of the glass substrate 30, the steel ball applies bending stress to the glass substrate 30 supported by the support base 23, on the outer circumference 31. The depressing speed of the load 21 is 0.5 mm per minute.

According to the experiences of the present inventors, if the breakdown strength is smaller than 100 N, there is a remarkable reduction in the yield due to the damage of the glass substrate for an information recording medium such as cracking and chipping. Therefore, the measurement results were evaluated as Very Good (marked by A) when the tested ten glass substrates all have the strength of 100 N or more. The measurement results were evaluated as Good (marked by B) when seven or more of the tested glass substrates have the strength of 100 N or more. If less than seven of the tested glass substrates have the strength of 100 N or more, the measurement results were evaluated as Poor (marked by C).

(Evaluation Results)

Table 1 shows the evaluation results. The symbols in the field of overall evaluation are defined as follows:

A: Flatness is "B" and the breakdown strength is evaluated as "A".

B: Both flatness and breakdown strength are evaluated as "B".

C: Either flatness or breakdown strength is evaluated as "C".

The substrates manufactured under the condition that the $K^+$ ion concentration and $Na^+$ ion concentration in the outer and inner circumferential end faces satisfy the relationship $0.1 \leq (W1-W3)/W2 \leq 5$ were verified to be excellent both in strength and flatness, and were rated as "B" or "A".

The substrates of the comparative examples manufactured in the case that (W1−W3)/W2 was less than 0.1 were evaluated as "C". The substrates of the comparative examples manufactured in the case that (W1−W3)/W2 exceeded 5 were evaluated as "C". In both cases, the overall evaluation is "C", and satisfactory glass substrates for an information recording medium were not manufactured. For all the glass substrates having been rated, the maximum value (W1) for the $K^+$ ion concentration after the cleaning step was located at the inside position away from the end face.

The invention claimed is:

1. A glass substrate for an information recording medium, the substrate comprising:

a disk shaped glass substrate having a center hole, containing at least $Na_2O$ as a composition thereof, and including, on an outer circumferential end face and an inner circumferential end face, regions which are chemically reinforced with a chemically-reinforcing treatment liquid containing a $K^+$ ion, wherein the following relationship is satisfied:

$$1 \leq (W1-W3)/W2 \leq 5$$

wherein:

W1 is a maximum value of a $K^+$ ion concentration at a central portion in a thickness direction of the glass substrate, in the chemically reinforced regions on the outer circumferential end face and the inner circumferential end face;

W2 is an $Na^+$ ion concentration at a position at which the $K^+$ ion concentration is the maximum value W1; and W3 is a $K^+$ ion concentration at the central portion in a thickness direction of the glass substrate and in a not chemically-reinforced region of the glass substrate.

2. The glass substrate for an information recording medium of claim 1, the glass substrate including $Li_2O$ in addition to $Na_2O$ as a component thereof.

3. The glass substrate for an information recording medium of claim 1, wherein the position at which the $K^+$ ion concentration is the maximum value W1 is located inside the glass substrate and away from the outer circumferential end face and the inner circumferential end face.

4. A method for manufacturing a glass substrate for an information recording medium, the method comprising the step of:

TABLE 1

| | Dipping time (min) | (W1 − W3)/W2 | Flatness (μm) | Evaluation | Breakdown strength (Number) | Evaluation | Overall evaluation |
|---|---|---|---|---|---|---|---|
| Comparative example 1 | 5 | 0.02 | 1.3 | B | 5 | C | C |
| Comparative example 2 | 10 | 0.05 | 1.4 | B | 6 | C | C |
| Example 1 | 20 | 0.1 | 1.3 | B | 7 | B | B |
| Example 2 | 80 | 0.5 | 1.6 | B | 8 | B | B |
| Example 3 | 150 | 1 | 2 | B | 10 | A | A |
| Example 4 | 500 | 3 | 3.5 | B | 10 | A | A |
| Example 5 | 900 | 5 | 5 | B | 10 | A | A |
| Comparative example 3 | 1000 | 6 | 5.5 | C | 10 | A | C |
| Comparative example 4 | 1200 | 8 | 7 | C | 10 | A | C | chemically reinforcing, with a chemical reinforcement processing solution containing a $K^+$ ion, a glass substrate which is a disk-shaped glass substrate, has a center hole, and contains at least $Na_2O$ as a composition thereof, wherein the following relationship is satisfied:

$$1 \leq (W1-W3)/W2 \leq 5$$

wherein:
W1 is a maximum value of a $K^+$ ion concentration at a central portion in a thickness direction of the glass substrate, in chemically reinforced regions on an outer circumferential end face and an inner circumferential end face;
W2 is an $Na^+$ ion concentration at a position at which the $K^+$ ion concentration is the maximum value W1; and
W3 is a $K^+$ ion concentration at the central portion in a thickness direction of the glass substrate and in a not chemically-reinforced region of the glass substrate.

5. The method for manufacturing a glass substrate for an information recording medium of claim 4, wherein the position at which the $K^+$ ion concentration is the maximum value W1 is located inside the glass substrate and away from the outer circumferential end face and the inner circumferential end face.

6. The method for manufacturing a glass substrate for an information recording medium of claim 4, the glass substrate including $Li_2O$ in addition to $Na_2O$ as a component thereof.

7. An information recording medium, comprising:
a disk shaped glass substrate having a center hole, containing at least $Na_2O$ as a composition thereof, and including, on an outer circumferential end face and an inner circumferential end face, regions which are chemically reinforced with a chemically-reinforcing treatment liquid containing a $K^+$ ion; and
at least a recording layer provided on the glass substrate for an information recording medium,
wherein the following relationship is satisfied:

$$1 \leq (W1-W3)/W2 \leq 5$$

wherein:
W1 is a maximum value of a $K^+$ ion concentration at a central portion in a thickness direction of the glass substrate, in the chemically reinforced regions on the outer circumferential end face and the inner circumferential end face;
W2 is an $Na^+$ ion concentration at a position at which the $K^+$ ion concentration is the maximum value W1; and
W3 is a $K^+$ ion concentration at the central portion in a thickness direction of the glass substrate and in a not chemically-reinforced region of the glass substrate.

8. The information recording medium of claim 7, wherein the recording layer includes a magnetic layer.

* * * * *